Oct. 7, 1969  J. L. DUNN, JR  3,471,372
VAPOR DEGREASING APPARATUS AND PROCESS
Filed July 26, 1967
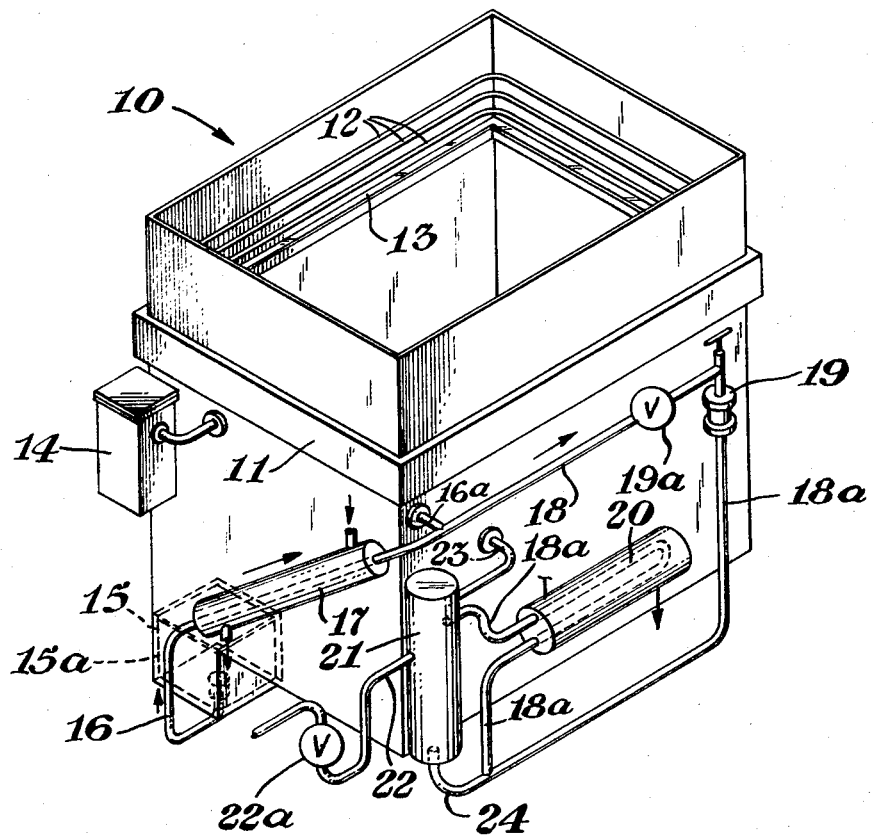
INVENTOR.
James L. Dunn, Jr.
BY
ATTORNEY United States Patent Office 3,471,372
Patented Oct. 7, 1969

3,471,372
VAPOR DEGREASING APPARATUS AND PROCESS
James L. Dunn, Jr., Lake Jackson, Tex., assignor to The Dow Chemical Company, Midland, Mich., a corporation of Delaware
Filed July 26, 1967, Ser. No. 656,186
Int. Cl. B08b 3/08, 5/00
U.S. Cl. 202—170                    2 Claims

ABSTRACT OF THE DISCLOSURE

A novel method and apparatus for degreasing metals. The method comprises introducing the soiled metal into hot solvent or vapors of a solvent, separating the solids, transporting and vaporizing a portion of the solvent and returning the vapors and hot solvent to the cleaning zone. The improved apparatus has means for removing the particulate soil from the cleaning zone, means for generating hot solvent and vapors independent of the cleaning zone but integral with the apparatus, a means for removing oils, greases, and the like from the solvent and means for returning the solvent in a clean condition to the cleaning zone.

BACKGROUND OF THE INVENTION

Field of the invention

The present invention concerns metal cleaning wherein, for example, a metal part soiled with cutting oils, grinding compounds, particulate metals, etc., is introduced into a solvent or the vapors of a solvent to dissolve the oils and greases and flush the metal fines and turnings and other particulate soils from the part. During the period the part remains in the solvent cleaning zone, its temperature is raised from ambient temperatures to the temperature of the surrounding solvent or vapors. This feature admits of removal of the metal part in a substantially dry condition.

Description of the prior art

The apparatus which is commercially employed to accomplish this type of cleaning is generally a rectangular vessel suitable for holding a liquid. The vessel is either direct fired or heated with steam or by an insulated electric heater to heat the liquid solvent, generally to its boiling point, and thus generate a zone of vapors above the liquid. In order to prevent the loss of large quantities of solvent vapors from the vessel, the side walls are cooled by water flowing through a water jacket normally integral with the walls. The interior of the vessel at about the same level as the water jacket is provided with cooling coils to condense the vapors, thereby maintaining an upper limit to the vapor zone and reducing the amount of solvent lost to the atmosphere. Such an arrangment has been in use for years. These conventional degreasers, with their heating means at or near the bottom of the liquid in the vessel, are subject to several disadvantages which make the degreaser a troublesome apparatus to operate. Firstly, the heat transfer to the solvent is steadily reduced as the passage of time occurs due to fouling of the heat exchange surface with particulate soil as well as decomposition products of the oil, greases and the solvent. It has become somewhat standard practice to shut down the degreaser weekly, drain the solvent and clean the sludge which forms during the week's operation. Further, it has been necessary to continuously or periodically during the operational week or at least once a week, when shut down, to distill the solvent to remove the accumulated oils and greases. Generally, the still used to accomplish solvent clean-up is a tank containing heating coils and condensing coils, e.g., simple column above a still pot with a condensor on the vapor side, so that the solvent is vaporized, the vapors condensed and collected and clean solvent returned to a storage tank or the degreaser in the liquid form. Such a device being of considerable size requires an inventory of solvent almost as great as that in the degreaser. The still creates certain problems among which is the depletion of certain inhibitors from the solvent. This depletion, or partitioning, as such is known to the trade, of the inhibitors into the pot of the still, removes the inhibitors from the degreaser where they are needed and is one more factor contribution to corrosion of the equipment and degradation of the solvent.

SUMMARY OF THE INVENTION

The present invention overcomes many of the prior art disadvantages by removing the particulate solids from the cleaning zone, removing the heating elements from the cleaning zone, and circulating the solvent through the heating zone, thus accomplishing a two-fold purpose, to wit: reducing fouling of the heat transfer surfaces by eliminating the contact therewith of the particulate solids and reducing the deterioration of the solvent due to undue hot spots or higher temperature differentials necessary in the conventional degreaser heaters. These advantages are attributable in part to the turbulent flow of the solvent through the heating zone and to passing only a small portion of the solvent through the heating zone to generate the necessary vapors. The vapors generated in the heating zone move the liquid in a turbulent manner. Further, by utilizing a similar type of heating and fluid moving means to vaporize the solvent in the oil and grease removal section on an intermittent or continuous basis, a more uniformly clean solvent is available.

BRIEF DESCRIPTION OF DRAWING

The drawing illustrates one embodiment of the present invention. A generally rectangular vessel 10 suitable for holding liquid and comprising four walls and a bottom is provided with a water-jacket 11 near the upper edges of the four walls to prevent the transfer of heat through the walls above the water-jacket, thus assisting in establishment of a vapor level. Juxtopositioned with respect to the water-jacket 11 and inside the vessel 10 are a set of cooling coils 12 which establish the upper reaches of the vapor level. Directly below the coils 12 is a collecting trough 13 connected through the wall of vessel 10 to a water-separator 14. So far, we have described the details which are common to most degreasers in commercial use. From here on, the description of the illustration will differ from that commonly known and familiar to the skilled worker. The base of the vessel 10 has a depressed section or sump 15 extending well below the main lateral portion of the vessel. It is to be understood that the depressed section or sump of the apparatus can also be a longitudinal trough, settling basin, tapered bottom structure or any other design which serves to move and isolate particulate matter in a relatively small but easily definable zone in the base of the apparatus. Within this section or sump 15 is a metal basket or sieve 15a which is removable. An outlet from the bottom of the the sump 15 is connected to a conduit or pipe 16 which traverses outwardly, and upwardly angularly the wall of vessel 10, re-entering the vessel 10 at a point 16a through the wall below the trough 13. The conduit or pipe 16 is provided along a portion of its length with a heat source such as a steam-jacket (heat exchanger) 17, although an electric heater or other heat source may be employed. This system as described constitutes a vapor-generator and solvent-lift.

Connected in liquid communication with the upper end of the vapor-generator and solvent-lift system, preferably at the point where conduit 16 enters the wall of vessel 10, is conduit 18. This conduit 18 is provided with an orifice flow control 19 and hand valve 19a ahead of the flow control 19. A conduit 18 then connects orifice flow control 19 through a heat exchanger (steam-jacket) 20 to a vapor-liquid separator 21. The upper end of the separator 21 is connected to the interior of the vessel 10 below the collecting trough 13. From the separator 21 there is provided an oil-rich solvent drain shown as a U shaped conduit 22 located so as to control the liquid level in separator 21 when a valve 22a is open. The bottom of separator 21 is connected by a conduit 24 to conduit 18a at a point prior to the entry of conduit 18a into the heat exchanger 20.

The apparatus just described operates in the following manner: liquid solvent, for example, a chlorinated hydrocarbon solvent such as trichloroethylene (1,1,2-trichloroethylene), is introduced into vessel 10 to establish a liquid level sufficient to fill conduit 16 to a level of at least about one-third of the steam-jacketed zone 17. The cooling water is turned on to both the water-jacket 11 and the cooling coils 12. Subsequently, the steam is supplied to the steam-jacket 17 surrounding the conduit 16. The solvent in the lower end of the steam-jacketed section of conduit 16 begins to vaporize, creating bubbles which cause the liquid solvent surrounding them to move further up into the conduit 16 and through the jacketed zone. Solvent enters behind these expanding bubbles, becomes heated, forming more bubbles, expanding and moving solvent still further upwardly into the jacketed section of the conduit 16. Finally, vapors and liquid solvent begin to overflow from conduit 16 into opening 16a thus entering the vessel 10 cleaning zone, establishing a vapor zone and a hot liquid solvent. When the vapor zone has been established work can be introduced for cleaning. Conduit 18 has by then filled with liquid solvent and by opening valve 19a, liquid solvent containing dissolved oil flows through the orifice flow control 19, fills conduit 18a and establishes a liquid level in separator 21. The heat exchanger 20 is supplied with heat to heat the solvent to vaporization temperature, and the so-heated solvent and any oil associated therewith is passed into the separator 21, the solvent vapor bubbles again being the motivating force for moving the liquid through the heat exchanger. The vapors on entering the separator 21 pass upwardly and return to the cleaning zone through conduit 23. The unvaporized material, a liquid rich in oil, falls or drops into the separators 21. This material is recycled to the heat exchanger 20 through conduits 24 and 18a. It is thus seen that the major portion of the solvent entering the oil removal system is continuously being removed as vapor and returned to the cleaning zone. The oils are concentrated in the liquid section of the separator 21 and continuously or intermittently withdrawn as the liquid level in the separator 21 rises above the overflow drain 22.

It is thus seen that there has been provided a system for generation of vapors and hot solvent with an attendant clean-up which overcomes to a major extent most of the problems of conventional degreasers. The particulate matter collects in an area removed from the cleaning zone and can be readily and conveniently withdrawn. The heat exchange surfaces are free of the major source of fouling. The solvent is not subjected to decomposition conditions. The oils and greases are maintained within limits which reflect good cleaning practice.

DESCRIPTION OF THE PREFERRED EMBODIMENT

A commercial degreaser manufactured of stainless steel, 4′ x 4′ x 3½′ deep, having a water-jacket, cooling coils, condensor trough and water separator, and having its interior divided into two sections with a dam of about 6 inches high extending across the vessel was employed. A sump was located below the degreaser floor through a hole. The sump had an outlet in its bottom. The sump also was provided with a basket of 100 wire mesh with flanged edges which mated with flanges extending around the opening. The arrangement was such that all liquid had to pass through the basket to obtain access to the clearance area between the basket and the sump walls. The outlet from the sump was connected to a pipe, which traversed the exterior side of the vessel and re-entered through the wall with a T coupling at a point below the water-jacket. Surrounding the pipe was a jacket provided with couplings for connection to a steam line. The upper end of the pipe through the T coupling also connected to a pipe which traversed the wall to a T which had one end connected to an orifice control valve and sight glass. The other end of the T was fitted with a bushing and a clean-out rod to clean the orifice if necessary. Extending from the orifice and sight glass assembly was a tube which connected to a multiple heat exchanger. The exit from the exchanger was an insualted tubing which connected to a vapor-liquid separator. The upper end of the separator was connected through a tubing to the cleaning zone at a point below the water-jacket. The bottom of the separator was connected to the tubing from the flow control prior to entering the heat exchanger, thus forming a recycle path for returning liquid in the separator to the heat exchanger. At a point located to keep the level proper in the separator, a drain provided an overflow from the separator, thus maintaining a predetermined liquid level in the separator.

In operation, this unit was capable of cleaning 60 pounds of parts per minute, these parts had holes, orifices, ground surfaces and the like, coated with oil and grinding compounds, and they contained screw thread turnings, shavings, and general dirt from processing. Each part carried about 1 gram of oil. In the example here set forth, the degreaser contained 1000 pounds of 1,1,1-trichloroethane (methyl chloroform). The oil in the degreaser was permitted to build up to and thereafter maintained at less than 20% by weight and the oil leaving the separator contained no more than 10% solvent. The steam to the main reboiler was 214° F. The condensate was 20.7 pounds per hour. The multiple pass heat exchanger was supplied with 90 p.s.i.g. steam. The condensate collected was 12.34 pounds per hour. After 24 hours of introduction of oily parts, the degreaser was run without any workload six hours per day for six days to determine the oil stripping ability of the system. The oil in the degreaser at the start of the run was 20% by weight and the methyl chloroform content of the oil leaving the separator was 12%. At the end of the sixth day, the oil content of the degreaser was negligible and the oil leaving the separator had only 5% methyl chloroform.

I claim:

1. In a cleaning apparatus for removing particulate contaminants and oils and grease from metal consisting of a container suitable for holding a liquid, a cooling means surrounding the periphery of said container near its top to condense vapors on making contact with said cooling means, the improvement which comprises a depressed portion in the lower part of said container suitable for withdrawal of particulate contaminates from the liquid and said container, a conduit in communication with the said portion, said conduit traversing said container in an upward direction and having its exit at a point higher than the inlet from the portion but below said cooling means; said conduit having heating means to vaporize at least a portion of liquid introduced into the interior of the conduit during the passage of said liquid through the conduit, said outlet of said conduit being in liquid-vapor communication with the interior of said container below the cooling means, said outlet also communicating with a second conduit extending from said first outlet through a heat exchanger and in communication with a liquid-vapor separator having its upper end in vapor communication with the interior of said container below said cooling means and its lower extreme in communication with the lower extreme of said second conduit and said separator being provided with a valved outlet to the surrounding environment.

2. A liquid handling system comprising a container suitable for holding a liquid and to degrease metal work, a cooling means surrounding the periphery of said container near its top to condense vapors on making contact with said cooling means, a conduit in communication with the lower portion of the container, said conduit extending upwardly and traversing said container and having its exit at a point higher than the inlet from the portion but below said cooling means; said conduit having heating means to vaporize at least a portion of liquid introduced into the interior of the conduit during the passage of said liquid through the conduit, said outlet of said conduit being in liquid-vapor communication with the interior of said container below the cooling means, said outlet also communicating with a second conduit extending from said first outlet through a heat exchanger and in communication with a liquid-vapor separator having its upper end in vapor communication with the interior of said container below said cooling means and its lower extreme in communication with the lower extreme of said second conduit and said separator being provided with a valved outlet to the surrounding environment.

References Cited

UNITED STATES PATENTS

| | | | |
|---|---|---|---|
| 1,938,841 | 12/1933 | Koch | 134—11 XR |
| 2,104,992 | 1/1938 | Hollerer. | |
| 2,366,949 | 1/1945 | Woppman et al. | |
| 3,085,948 | 4/1963 | Kearney | 134—108 XR |

DANIEL BLUM, Primary Examiner

U.S. Cl. X.R.

134—107, 108; 202—169